United States Patent [19]

Stuparits et al.

[11] Patent Number: 4,544,809
[45] Date of Patent: Oct. 1, 1985

[54] ARRANGEMENT FOR SUBSCRIBER LINE RING TESTING

[75] Inventors: Jeffrey J. Stuparits; Russell L. Cramer, both of Muskegon, Mich.

[73] Assignee: General Telephone of Michigan, Mich.

[21] Appl. No.: 563,737

[22] Filed: Dec. 21, 1983

[51] Int. Cl.⁴ ............................................. H04M 3/26
[52] U.S. Cl. ..................... 179/175.2 R; 179/175.2 D; 179/175.2 B
[58] Field of Search ................. 179/175.2 D, 175.2 B, 179/175.2 C, 175.2 R, 27 FE, 18 AB

[56] References Cited

U.S. PATENT DOCUMENTS 4,453,048  6/1984  Daniels et al. .............. 179/175.2 B Primary Examiner—Stafford D. Schreyer
Attorney, Agent, or Firm—Charles A. Doktycz

[57] ABSTRACT

An arrangement for automatically testing a plurality of subscriber lines, which are operationally connected to an electromechanical switching system is shown. Operational service is to be transferred from the electromechanical switching system to a digital switching system. This arrangement provides for automatically verifying whether the digital switching system is arranged to apply the proper ringing signal to each subscriber by a comparison with that applied by the electromechanical switching system.

7 Claims, 5 Drawing Figures

ARRANGEMENT FOR SUBSCRIBER LINE RING TESTING

CROSS-REFERENCE TO RELATED APPLICATIONS

The present application is related to copending U.S. patent application Ser. No. 563,738 filed Dec. 21, 1983 having the same inventors and being assigned to the same assignee.

BACKGROUND OF THE INVENTION

The present invention pertains to pre-cutover switching system testing and more particularly to an arrangement for an automated testing for the application of the proper ringing signals to the subscriber line.

When a new switching system, such as a GTD-5 EAX, is installed to replace an existing switching system such as a step-by-step system, there is a testing interval during which time the subscriber's cables are double jumpered to both switching systems. That is, each subscriber line will have an appearance on an inlet to each switching system. This double jumpering arrangement is made at the main distribution frame.

Typically, manual procedures were employed to verify a subscriber's line connection prior to cutover of the subscriber's service from one switching system to another. These manual procedures would be as follows: first, an operator initiated a subscriber type access to the untested switching system. Then, the operator sent out the calling number of the subscriber to be verified.

The untested switching system connected the operator to the subscriber and applied the ring signaling. If the subscriber answered the call, the operator would ask whether their connection was audible and noise free and verified that the correct subscriber had been reached. If the subscriber didn't answer, the test had to be retried.

Such manual procedures are time consuming and uneconomical. Furthermore, the subscriber needs to become involved in the testing operation.

Accordingly, it is the object of the present invention to provide an eoonomical and automated arrangement for subscriber line start verification and ring testing which is devoid of subscriber participation or annoyance.

SUMMARY OF THE INVENTION

An arrangement for ring testing in a pre-cutover switching configuration includes a number of switching system subscribers which will ultimately have their operative connection changed from a first switching system to another switching system. At least two switching system subscribers are connected to the first switching system. The first switching system operatively connects these subscribers to one another or to any of the other switching system subscribers.

The switching system subscribers of the first switching system are simultaneously connected to a second switching system which is in an untested condition. The second switching system includes a switching network connected to the subscribers, and a processor complex is connected to the switching network.

A test switch train is arranged to access the first subscriber and this test train connection arrangement is operated to connect the first subscriber through the first switching system for a test access.

The regular switch train of the step-by-step switching system is also connected to the first subscriber and is operated to connect any of the switching system subscribers to any other first switching system subscriber.

In this arrangement for subscriber line ring testing the same subscribers are also connected to a second switching system. The second switching system is in an untested condition and is not yet usable for interconnecting said subscribers.

The second switching system has a switching network connected to each of said plurality of subscribers for establishing a connection between these subscribers.

The present arrangement for subscriber line start verification and ring testing includes an automated arrangement for testing, that is connected to the test train and switching system of the first switching system and is also connected to the second switching system. This automated testing arrangement is operated to request the ringing signal data as registered in the second switching system for each subscriber and then operate the test train of the first switching system to a first subscriber line terminal.

The automated testing arrangement also has a connection to the regular connection means for another connection to the first subscriber. The automated arrangement for testing is then operated to transmit a sequence of directory number signals to the regular connection means for connecting to the first subscriber terminal but withholds the last digit. The test system then makes a test to determine if the line is busy is a loop start, ground start or will not start line. After these tests the last digit is transmitted. The regular connection means upon this completed connection to the first subscriber terminal commences to ring the first subscriber.

The automated testing arrangement via the test train connection of the first switching system monitors the subscriber terminal and upon detecting the first cycle of ringing causes the release of said regular connection. During the release interval the zero crossings of the ringing signal are measured and the ringing frequency determined, compared with the data obtained from the second exchange and the results recorded..

DESCRIPTION OF THE PREFERRED EMBODIMENT

Figure 1:
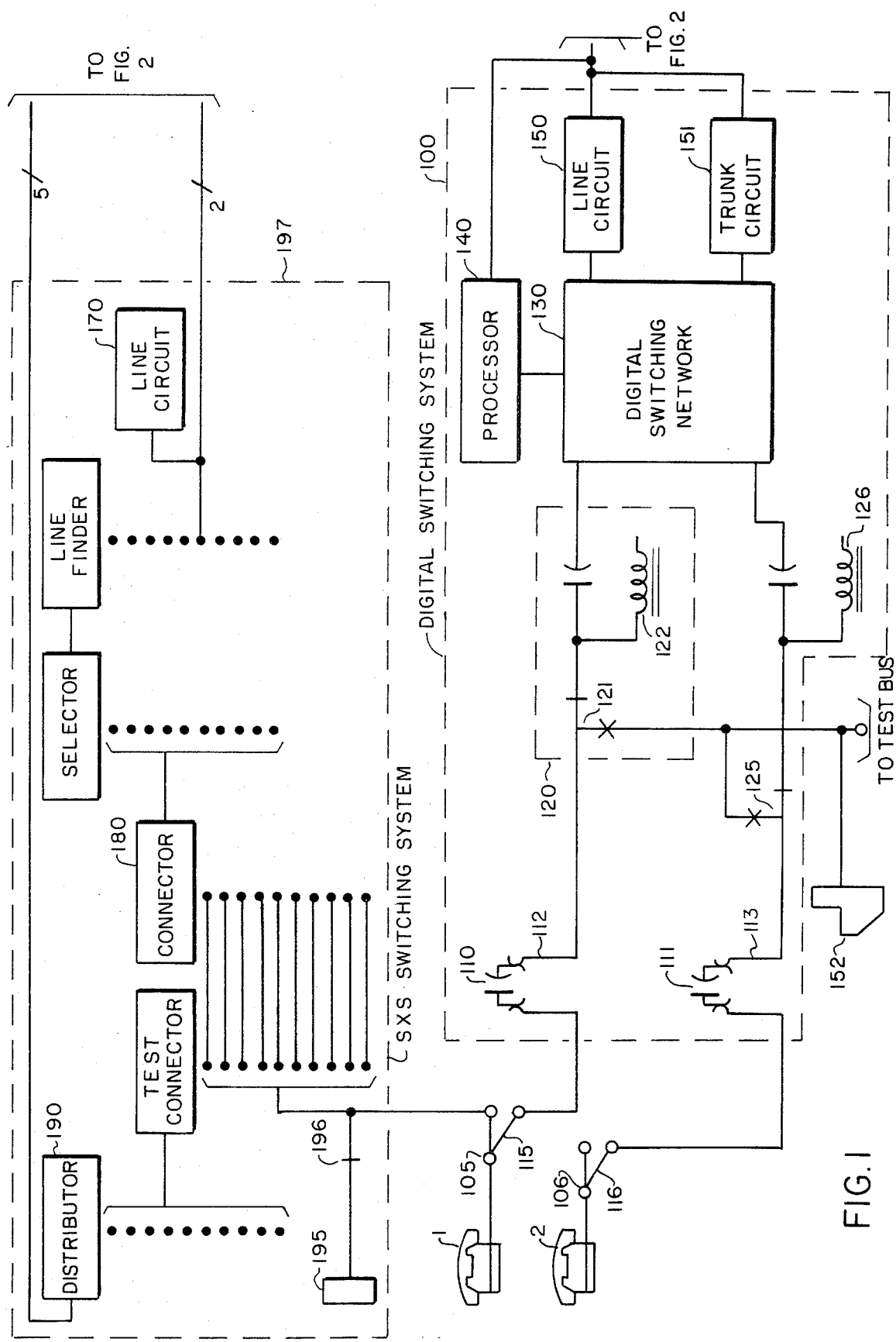
FIG. 1 is a schematic diagram of an arrangement for testing in accordance with the principle of operation of the present invention.

Referring to the drawing FIG. 1, two telephone subscribers 1 and 2 are shown connected to a step-by-step switching system 197 and to a digital switching system 100. Subscriber 1 is connected to these switching systems via the double jumper connection at 105 and subscriber 2 is connected to both switching systems via the double jumper connection at 106. A step-by-step switching system is shown, although this invention may be practiced with other electromechanical switching systems as well (e.g. No. 1 EAX, No. 2 EAX, manufactured by GTE Automatic Electric Incorporated or others). The digital switching system is a time switching system such as, the GTD-5 EAX (manufactured by GTE Automatic Electric Incorporated) or other time division switching systems having similar features of other manufacturers.

The subscribers are shown connected to the digital switching system via capacitors 110 and 111. These capacitors are used only during the testing phase, normally the jacks 112 and 113 connect the line conductors through to the line circuits such as 120.

Subscriber 1 is connected through capacitor 110 to line circuit 120. Line circuit 120 includes a test relay with make-break contacts 121 and a battery feed device 122. Contacts 121 are normally closed to maintain subscriber 1 connected to the switching network 130. Contacts 121 may be operated to enable the line of subscriber 1 to be connected to a test bus for maintenance accesses. Similarly, subscriber 2 may be connected to this test bus via the operation of contacts 125.

The digital switching system includes a processor 140, which is operatively connected to digital switching network 130. Line circuit 150 and trunk circuit 151 are connected to the switching network 130 and provide for connecting subscribers 1 and 2 to other subscribers or to other switching systems. Processor 140 includes a CPU arrangement with a memory containing a data base for operating the switching system. This data base enables the digital switching system to associate particular subscribers with particular line circuits and other equipment and to apply ring signals as required by a particular subscriber station.

The digital switching system is in the pre-cutover condition, that is, not in a fully tested and operative configuration to provide telephone service to the subscribers. The step-by-step switching system is on-line and provides active telephone service to subscribers 1 and 2, until cutover of the digital switching system.

Subscriber 1 is thus connected via double jumpers at 105, to the contact banks of connector 180. Quiescent operating potentials are applied to each subscriber's line via a line relay 195 connected in series with the break contact 196 of a cutoff relay. When a subscriber is called, the line relay 195 is disconnected by the operation of the cutoff relay and the line is switched through to a battery feed device of a connector or junctor or other similar circuit.

Figure 2:
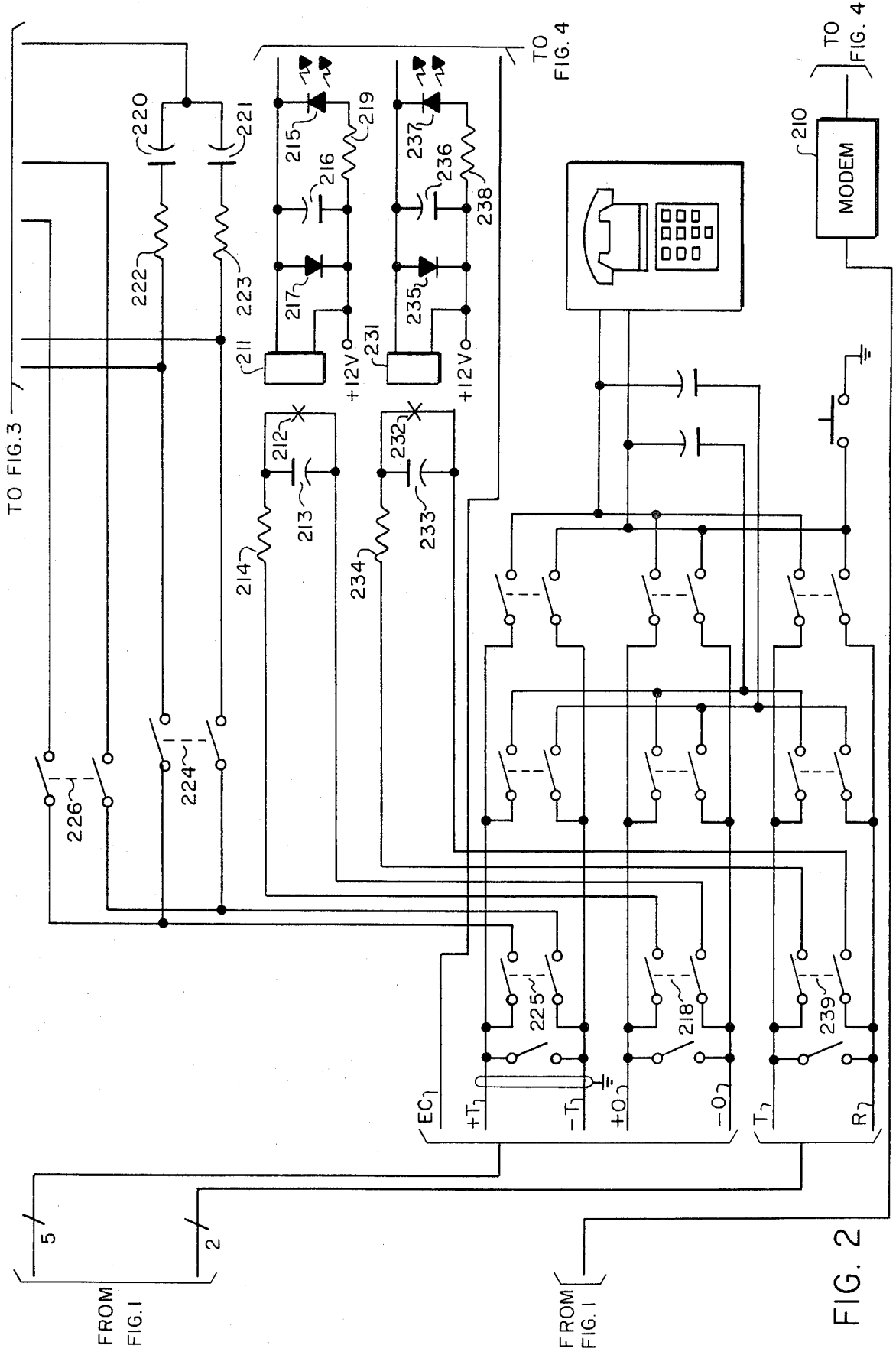
FIGS. 2, 3 and 4 when placed together as shown in FIG. 5 disclose the interface of the testing system.
Figure 3:
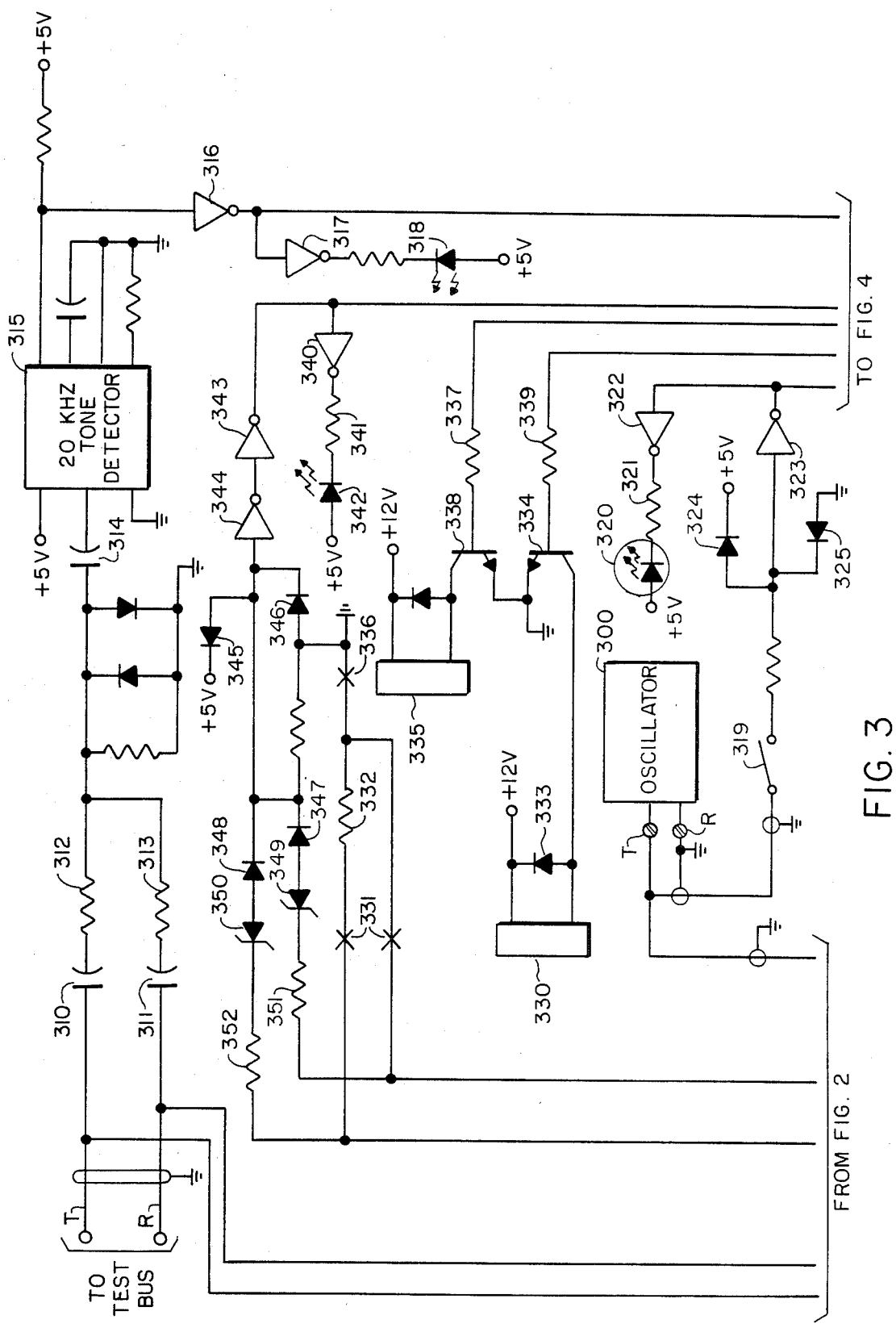
Figure 4:
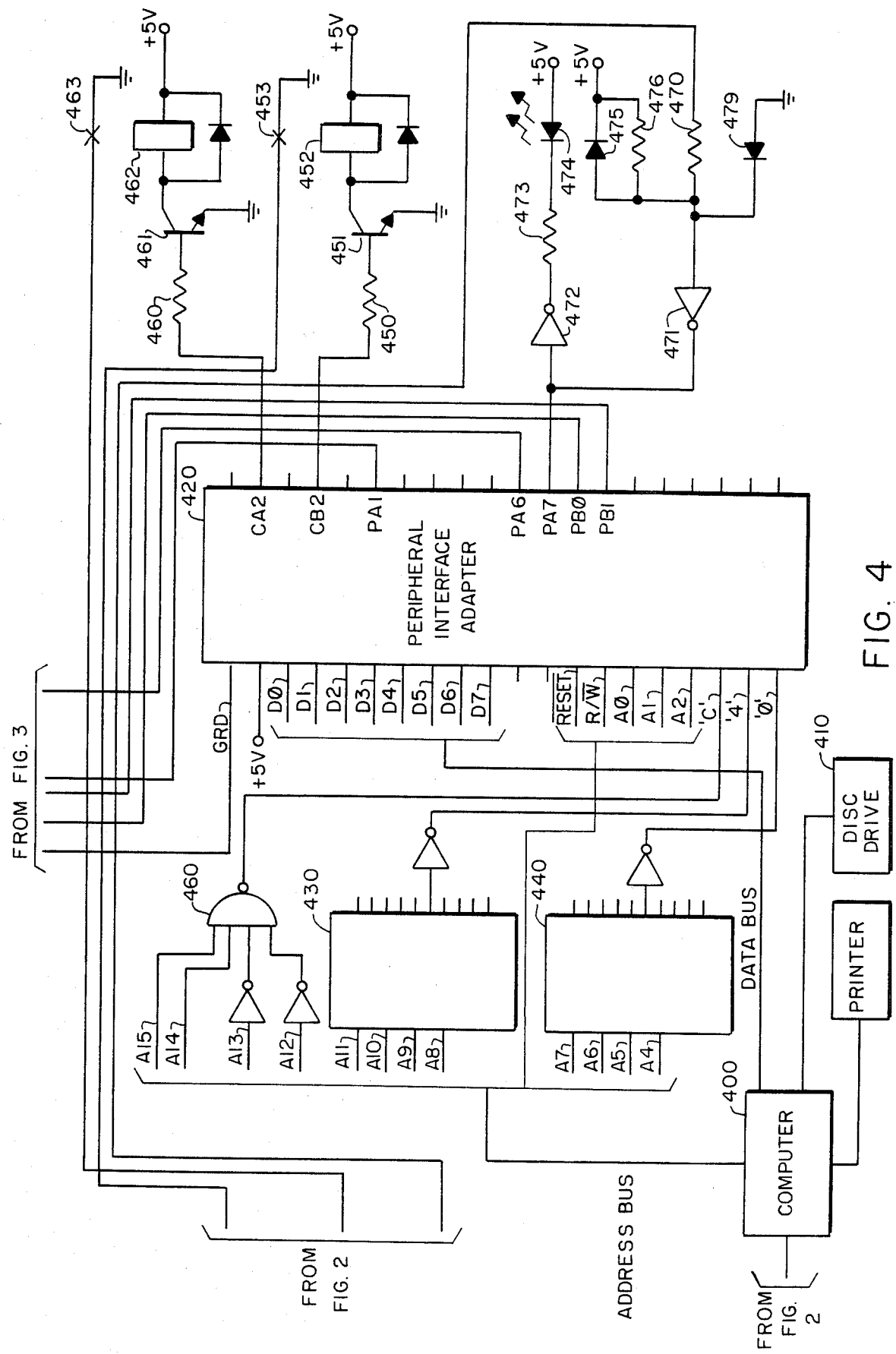
Figure 5:
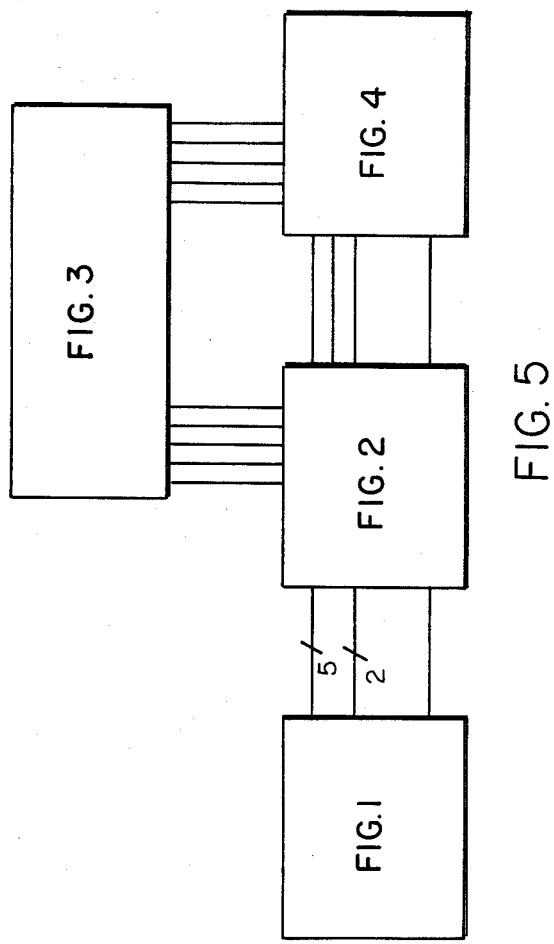
FIG. 5 shows how FIGS. 1, 2, 3 and 4 may be placed to disclose the novel system of the invention.

The testing arrangement of FIGS. 2, 3 and 4 is connected to both the step-by-step switching system and to the digital switching system. The testing system shown is a microcomputer controlled test system which is arranged to provide for a number of line verification and ringing tests of the digital switching system before it is put into active service. These tests include: verifying that the assigned directory number will reach the same subscriber line from either the step-by-step switching system or the digital switching system. When this and any other incidental function has been successfully tested on each of the subscriber lines, the digital switching system may be placed into operational service and the step-by-step switching system may be removed from service.

The test system disclosed tests the ringing signal as applied by the connection to subscriber station 1. In the pre-operational configuration, the digital switching system has capacitors 110 and 111 inserted in the line conductor path which serves to open circuit subscribers 1 and 2 from the switching network 130.

In order to test the ringing frequencies as applied by the first switching system for comparison with the data loaded into the second switching system.

The computer 400 accesses the second switching system processor 140 via a modem 210 to obtain a block of this data. The computer may be an Apple II as described in publication #A2L2001, copyright 1982, 1983, (030-0356-C) with an associated disc memory data store and a printer for printing out test results along with associated interface circuitry to the exchange to be tested.

The interface equipment includes a key cabinet and telephone for use by the maintenance or test personnel as may be required in verifying reported conditions. As shown in the illustrated embodiment, the access to the exchange to be tested, the exchange that is to replace it is through the interface circuitry. A direct data path is also included between the Apple Computer 400 and the processor 140 of the digital exchange 100.

In operating this test system the directory numbers to be tested are loaded into the associated disc memory 410. The Apple Computer 400 acting as a sequencing and control processor, proceeds to seize the test distributor 190 to dial it up to the subscriber terminal in the old office. The dial control path to the test distributor is from the computer 400 and includes the address decoders 430, 440, 460 and the data bus path via the peripheral interface adapter 420 through which the pulses for controlling the pulsing relay 452 at contacts 453 are controlled. The pulsing path is via resistor 450 and amplifier transistor 451. The pulsing path from contacts 453 controls a slave relay 211 which operates the actual pulsing contacts 212, through the manually set connect contacts 218 to the test distributor 190. Resistor 214 and capacitor 213 aid in contact spark suppression, while diode 217 and capacitor 216 suppress the relay winding inductive spikes. Diode 215 is a light emitting diode that flashes to indicate dialing is in progress. Thus completing the test connection to the subscriber terminal in the step-by-step switching system 197. At this time, a path is completed from the subscriber terminals via the EC lead of the test distributor to the peripheral interface adapter 420, terminal PA7 to monitor the line terminals for a busy condition. This path includes resistor 470 and amplifier 471. Should a busy condition be encountered on the line, the test for that line is aborted at this time.

If the line is not busy, a test is next made to determine if the line is a loop start line. This is accomplished by the computer 400 through the interface adapter terminal PB0 via resistor 339 and amplifier transistor 334, operating relay 330 to complete a seizure loop at contact 330 and including resistor 332. The remainder of the path includes manual connect contacts 226 and 225 to the test leads of the test distributor. If the computer 400 sees the EC lead go to ground potential, the line is recorded as a loop start line. If within three seconds the line does not start, the ring lead is grounded at contacts 336. The operating path for relay 335 to close contacts 336 is from the computer 400 via the adapter 420, terminal PB1, resistor 337 and amplifier transistor 338. If now the EC lead goes to ground, the line is considered to be a ground start line, if not, the line is recorded as a "did not start." The terminations at contacts 331 are then removed. Simultaneously, with the performance of the tests for the busy condition the computer proceeds to seize the conventional path through exchange 197 and outpulses all but the last digit of the subscriber's directory number. This is accomplished similarly to the seizure of the test distributor but the control is from adapter 420, terminal CA2 via resistor 460, amplifier transistor 461 to pulse relay 462. Relay 462 follows the commands received and at contacts 463 repeats then to relay 231. The actual pulsing path is at contacts 232 via resistor 234 and manual connect contacts 239. Capacitors 232 and 236 are for noise suppression while diode 237 operated via resistor 238 provides a visual indication of line pulsing.

Upon completion of the determination of the line start type category, the computer controls relay 462 to outpulse the final digit to the exchange connector 180 to ring the subscriber. The computer now monitors the test distributor test leads +T and −T via the path including manual access contacts 225 and 226 to the rectifier circuit consisting of diodes 347 and 348 buffered by resistors 351 and 352 and zener diodes 349 and 350. The rectified direct current pulses are amplified at 343 and 344 and conducted to the peripheral adapter 420, terminal PA1. Light emitting diode 342 operated via resistor 341 and amplifier 340 provides a visual indication of the receipt of ringing. The computer is now operated to determine the ringing frequency by measuring the periods of the pulses and to record the data.

On sensing the first cycle of the ringing current the computer operates to release the switch train by releasing relay 462. This release takes about 300 milli-seconds to propagate to the connector 180. During this time, the computer 400 is measuring the time between zero crossings of the ringing current. After 16 periods have elapsed, the frequency of each sample is calculated to obtain an actual ringing frequency. This actual ringing frequency is compared to the data base frequency obtained from the digital exchange 100. If the two frequencies do not agree, a mismatch indication is printed. Since the computer 400 obtains the telephone numbers to be tested from the digital exchange data base, operation of this test system for ringing does not require a test person's time, thus making it a very economical test system. The test results are now available for test personnel verification and correction as required by the printed out report.

Additional equipment shown is included for use by the test personnel in the performance of manual testing and verification of the test results.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a pre-cutover switching configuration, an arrangement for subscriber line verification and ring testing comprising:
a plurality of switching system subscribers;
a first switching system connected to said plurality of switching system subscribers, said first switching system operated to connect any of said switching system subscribers to other switching system subscribers, said first switching system comprising:
said plurality of switching system subscribers including at least a first subscriber operatively connected to said first switching system for said connection to other switching system subscribers; and
test connection means connected to said first subscriber and said test connection means operated to connect said first subscriber through said first switching system for a test access;
regular connection means connected to said first subscriber and operated to connect any of said switching system subscribers to said first switching system subscriber;
said arrangement for subscriber line verification and ring testing further comprising:
a second switching system connected to said plurality of switching system subscribers, said second switching system being in an untested condition for connecting said subscribers, said second switching system comprising:
said first subscriber connected to said second switching system; and a processor controlled switching network connected to each of said plurality of subscribers for establishing connections therebetween;
said arrangement for subscriber line verification and ring testing further comprising:
means for testing connected to said test connection means of said first switching system and connected to said processor of said second switching system, said means for testing operated to request transmission of ringing signal data to said means for testing;
said means for testing further operated to store said data;
said means for testing connected to said first subscriber via said test connection means for said test access;
said means for testing operated to test for a non-busy condition of said first subscriber via said test connection means and thereafter operated to close said first subscriber line loop via said test connection means;
said means for testing connected to said regular connection means for connecting to said first subscriber;
said means for testing operated to transmit a sequence of signals to said regular connection means, said sequence of signals including a number of signals being one less than the number of signals for connecting to said first subscriber;
said means for testing operated responsive to detection of a busy condition via said test connection means after closing said first subscriber line loop via said test connection means to transmit a second signal via said regular connection means;
said regular connection means operated in response to said second signal to complete said connection of said regular connection means to said first subscriber and to apply ringing current to said first subscriber, said means for testing operated upon detecting said ringing current via said test access means to release said regular connection means, said means for testing thereafter operated to determine the frequency of the detected ringing and to compare it with said stored data; and
said means for testing further operated to store an indication of said data and said ringing current frequency.

2. In a pre-cutover switching configuration as claimed in claim 1 further including printout terminal means operated upon storage of said indication of said data and said ringing current frequency to produce a printout thereof.

3. In a pre-cutover switching configuration as claimed in claim 1 further including a means in said means for testing operated after detection of a busy condition after closing said first subscriber loop to store an indication of said first subscriber line as being a loop start line.

4. In a pre-cutover switching configuration as claimed in claim 3 further including printout terminal means operated upon storage of said indication to produce a printout thereof.

5. In a pre-cutover switching configuration as claimed in claim 1, wherein said connection of said means for testing to said switching network includes a line circuit connected between said means for testing and said switching network.

6. In a pre-cutover switching configuration as claimed in claim 1, wherein said means for testing is connected to each of said plurality of subscribers, on a one at a time basis, via said test connection means and said regular connection means for testing.

7. In a pre-cutover switching configuration as claimed in claim 1, wherein said means for testing requests connection to each of said plurality of subscribers one at a time via said switching network.

* * * * *